Sept. 17, 1929.　　　G. W. ESCHENBACH　　　1,728,402
PICTORIAL ADVERTISING DISPLAY APPARATUS
Filed Sept. 26, 1927　　　4 Sheets-Sheet 1
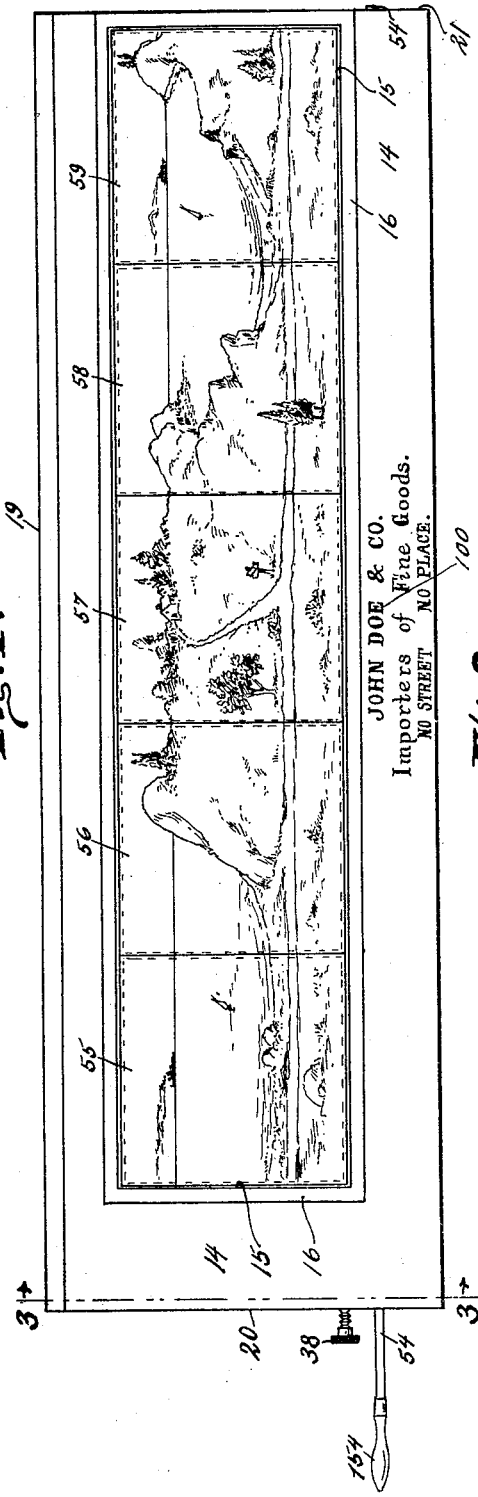
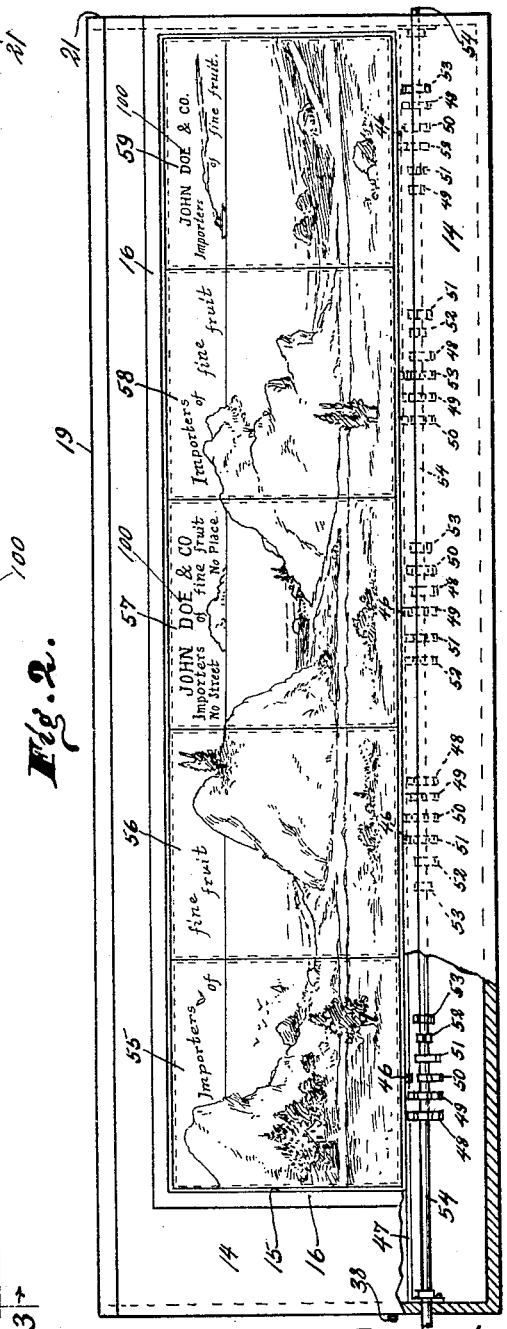
Inventor.
Gustavus. W. Eschenbach.
by
Lockwood & Lockwood,
His Attorneys.

Sept. 17, 1929.  G. W. ESCHENBACH  1,728,402
PICTORIAL ADVERTISING DISPLAY APPARATUS
Filed Sept. 26, 1927  4 Sheets-Sheet 2
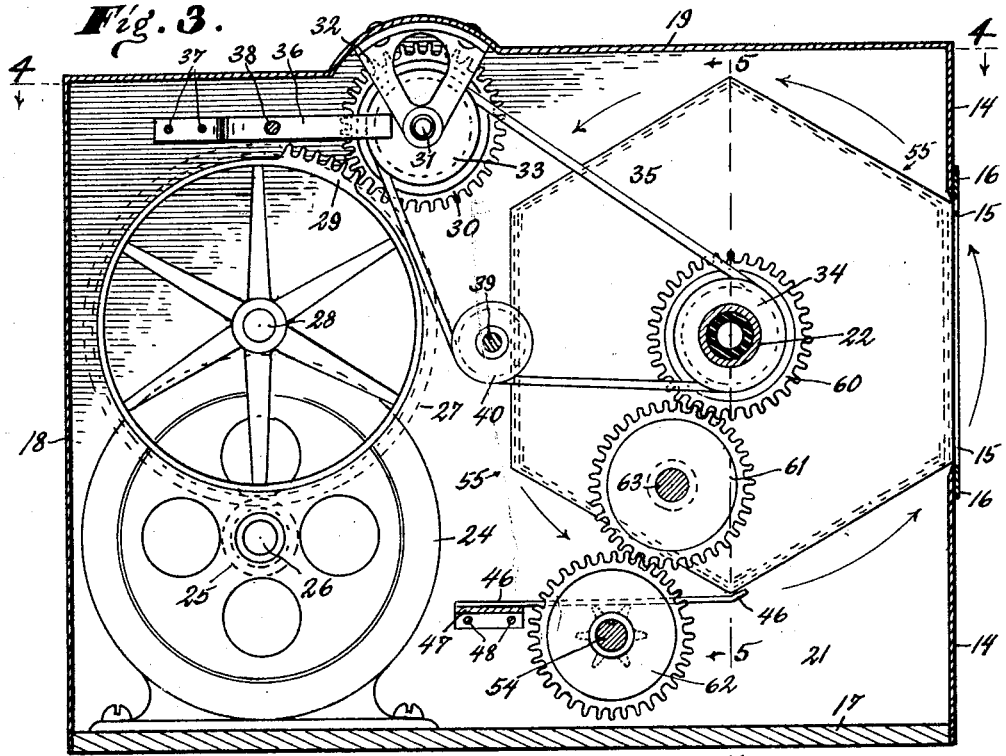
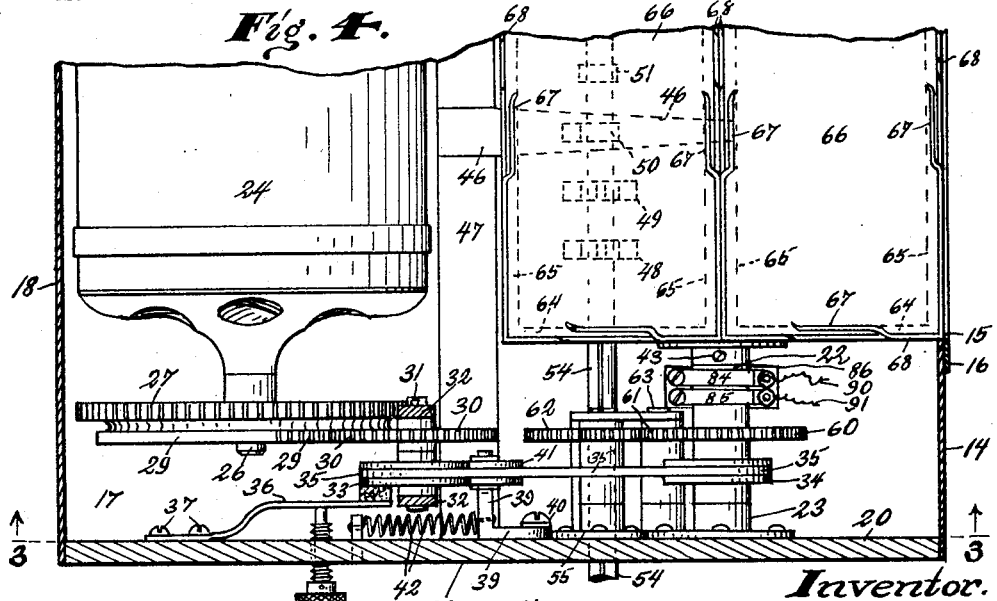
Inventor.
Gustavus W. Eschenbach.
by
Lockwood & Lockwood,
His Attorneys.

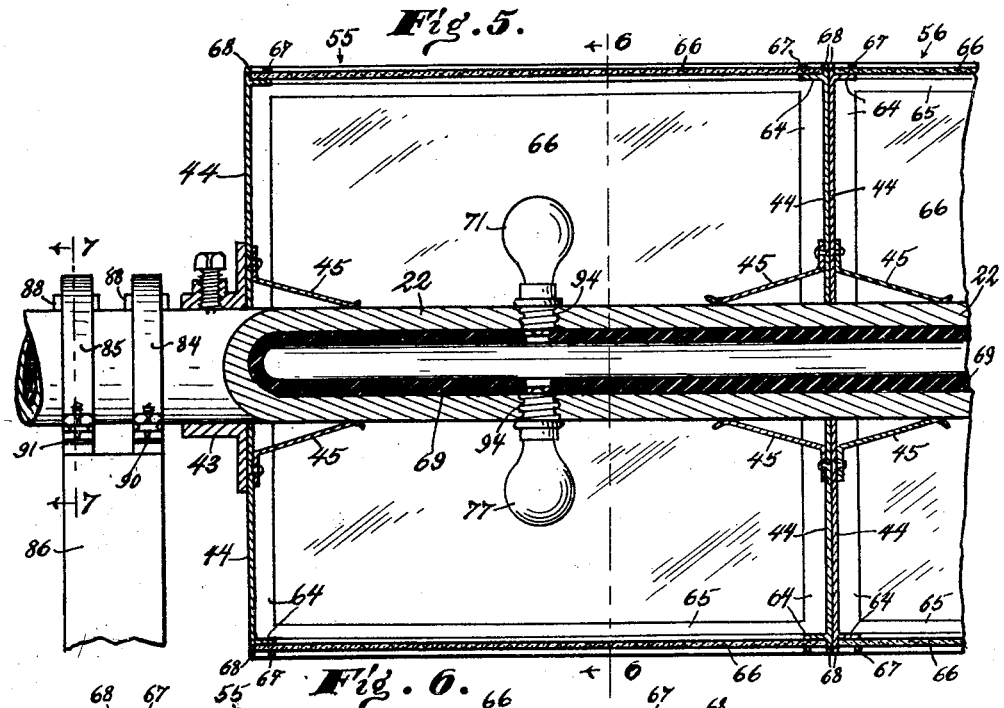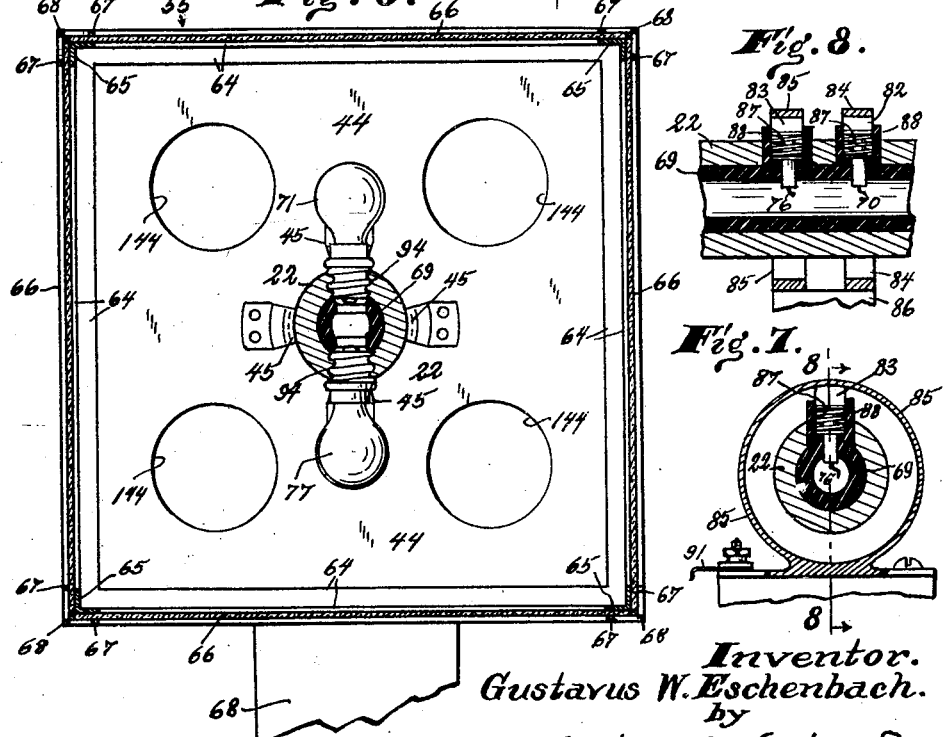

Sept. 17, 1929.  G. W. ESCHENBACH  1,728,402
PICTORIAL ADVERTISING DISPLAY APPARATUS
Filed Sept. 26, 1927  4 Sheets-Sheet 4

*Inventor.*
Gustavus W. Eschenbach.
by
Lockwood & Lockwood,
His Attorneys.

Patented Sept. 17, 1929

1,728,402

UNITED STATES PATENT OFFICE

GUSTAVUS W. ESCHENBACH, OF LOS ANGELES, CALIFORNIA

PICTORIAL-ADVERTISING-DISPLAY APPARATUS

Application filed September 26, 1927. Serial No. 221,876.

This invention relates to means for displaying pictorial advertising and the like and an object thereof is to provide a simple and efficient means for attracting the attention of the public to the matter displayed. To that end I provide an apparatus having a plurality of aligned blocks, that have pictorial advertising and the like, painted, impressed or printed on their sides with the pictorial subject matter arranged to match at adjacent marginal edges of the sides; and means connected therewith for intermittently rotating the blocks separately, promiscuously or altogether and in such manners as will present varied panoramic pictorial views adapted to attract attention to them. In other words I provide means of attracting attention to the subject matter by the continuity of the change in the panoramic view. The movement of a block, series of blocks, or all of the blocks to harmoniously change a panoramic view, or change one panoramic view for another will naturally attract and hold the attention of the public a sufficient time for the subject matter to be observed or read.

Another object of the invention is to provide an apparatus for displaying advertising or the like, that in addition to attracting the attention of the public can also be utilized for entertainment, or pleasing instructive pastime. In other words the faces of the blocks can be provided with humorous pictures matched adjacent their marginal edges which, when turned to changed position, will produce a new combination that will provide amusing entertainment, or the pictorial views can be subject matter that is instructive as well as entertaining.

Another object of the invention is to provide an apparatus for displaying pictorial advertising that is illuminated in a new effective and useful way. That is, I provide lamps within the blocks that are colored so as to produce novel effects adapted to attract the attention of the public to the advertising.

A feature of the invention is shown in the novel means for mounting the blocks on an intermittently actuated shaft so that they can be held stationary independently of one another in a predetermined position while the shaft rotates, which mounting will also permit the blocks when not intercepted to rotate with the shaft.

Another feature of the invention is in the novel means for interrupting the rotation of the blocks at predetermined periods with means connected therewith for manually altering the periods in which the rotation of the block is interrupted.

Another feature of the invention is in the construction, combination and arrangement of the parts whereby the blocks are mounted in a casing adjacent an aperture through which a single side of each block is visible, so that the changing panoramic view formed by matched sides of the picture blocks appear as if arranged in a picture frame.

Another feature of invention is in the novel means for mounting and holding the pictorial or advertising sides of the blocks in their respective frames whereby they can be removed when desired and replaced with other sides.

Other objects, advantages and features of invention may appear from the accompanying drawings, the subjoined detailed description and the appended claims.

The accompanying drawings illustrate the invention.

Figure 1 is a front view of a pictorial advertising display apparatus that is constructed in accordance with this invention, showing a panoramic view on the matching faces of five aligned blocks, and an advertisement on the face of the cabinet.

Fig. 2 is a view analogous to Fig. 1, showing another panoramic view formed by a one step rotation of the two end blocks and center block while the other blocks are held stationary and showing the advertising arranged on the blocks instead of the cabinet; also showing a corner portion of the cabinet broken away to show in full line the cams for stopping the rotation of the left hand block, the other cams being indicated by dotted lines, and parts omitted for the sake of clearness in the drawing.

Fig. 3 is an enlarged cross section on line 3—3, Fig. 1, parts shown diagrammatically.

Fig. 4 is a fragmental section on line 4—4 of Fig. 3, showing a plan view of the driving apparatus.

Fig. 5 is an enlarged fragmental section on line 5—5, Fig. 3, parts omitted.

Fig. 6 is a cross section on line 6—6, Fig. 5.

Fig. 7 is a cross section on line 7—7, Fig. 5.

Fig. 8 is a section on line 8—8, Fig. 7.

Figure 9:
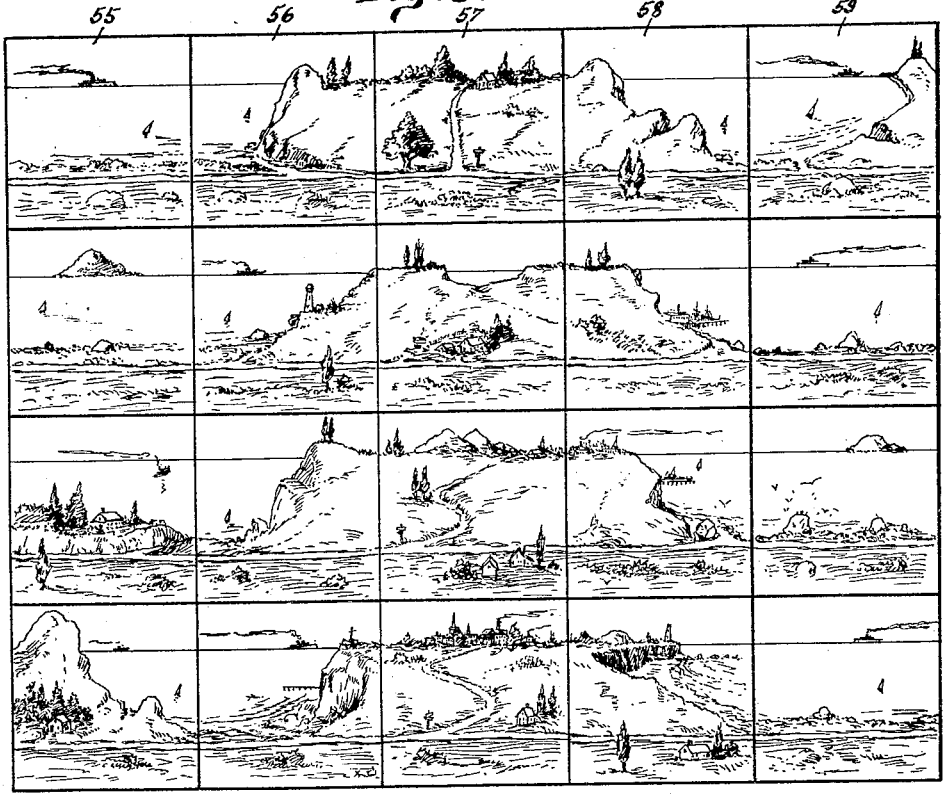
Fig. 9 is a projected view of the faces of five square blocks with pictures on the faces of each block that are adapted to match at joining marginal edges so as to form a series of panoramic views.

The apparatus includes a closed cabinet having a front 14 through which there is an aperture 15 surrounded by a picture frame 16, bottom 17, back 18, roof 19, and ends 20, 21, that can be formed of any suitable material and secured together in any well known way.

The picture frame 16 is shown plain in the drawing, but it is understood that it may be ornamental if desired; also it is understood that all of the space on the front 14 outside of the aperture 15 can be utilized for advertising or ornamentation as may be desired; an arbitrary John Doe advertisement 100 is shown on the front of Fig. 1 and also shown on the blocks in Fig. 2.

A hollow block shaft 22 is mounted in bearing 23 secured to the end walls of the cabinet; and it is adapted to be intermittently rotated by a motor 24.

A gear 25 on the motor shaft 26 is arranged to drive a large gear 27 on a shaft 28. The gear 27 carries a mutilated gear 29 that is about the same diameter; and the teeth of this gear are arranged to mesh with the teeth of a pinion 30 mounted on a shaft 31 supported by brackets 32 secured to the roof 19, so that when the motor is driven the pinion will be intermittently rotated a fraction of a complete revolution, or the degrees in the arc occupied by the teeth of the mutilated gear.

Figure 12:
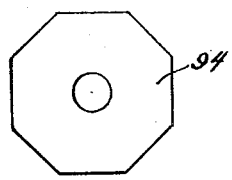
Fig. 12 is a diagrammatic side view of a block having eight sides or faces.

The number of teeth in the mutilated gear can be arranged to rotate the pinion forty-five, sixty or ninety degrees as may be required. When the blocks have eight pictured sides as indicated in Fig. 12, the mutilated gear 29 is provided with sufficient teeth to move the pinion 30 forty-five degrees; and when the blocks have six pictured sides as indicated in Figs. 3 and 4 the pinion 30 is moved sixty degrees, and when the blocks have four pictured sides, as indicated in Figs. 5, 6 and 9 the pinion 30 is moved ninety degrees each time the mutilated gear makes a complete revolution.

For the sake of clearness in illustration the gear 25 on shaft 26 and gear 27 on shaft 28 are shown diagrammatically in Fig. 3 and they are proportioned in the ratio of about ten to one, so that there will be considerable time in the intervals between the intermittent movements of the pinion 30 so the blocks will be held stationary a sufficient time for the subject matter to be seen and understood.

A pulley 33 is secured to the shaft 31 in line with another pulley 34 of the same diameter that is secured to the shaft 22 and they are connected by a belt 35 so that when the pinion 30 is actuated the shaft 22 will be rotated substantially the same distance or number of degrees as the pinion 30.

A brake 36 is arranged to engage the side of the pulley 33 and stopping it the moment the last tooth of the mutilated gear 29 has been released from driving engagement with the teeth of the pinion 30. This brake is secured to the end wall 20 by screws 37; and tension is applied to the brake by a hand screw 38.

Also a belt tightening arm 39 of usual type is pivotally connected to the wall 20 by a bearing 40. The arm 39 carries a pulley 41 that engages the inner surface of the belt 35 and by means of spring 42 holds it taut on the pulleys 33, 34.

The picture blocks are preferably formed with either four or six faces, and they are mounted and rotated so that a face of each can be intermittently exposed through the aperture 15 in the cabinet. That is, the blocks are mounted so that they can be stopped from rotation without interfering or stopping the rotation of the shaft 22, and when stopped a face of each is visible through the aperture in the cabinet, and collectively the pictured faces form a panoramic picture.

The blocks are preferably constructed and mounted as best shown in Figs. 3, 4, 5 and 6 and they are arranged between fixed collars 43 on the shaft 22 so that adjacent ends 44 of the respective blocks engage one another, but they are sufficiently loose for each block to turn freely on the shaft irrespective of the other blocks when necessary.

Spring bars 45 are secured to the block ends 44 with their free ends inclined inwardly toward the longitudinal axis of the shaft 22 so that they grip it with sufficient force to cause the blocks to rotate with the shaft when they are not interrupted by the spring stops 46, see Figs. 3 and 4.

A spring stop 46 is provided for each block and they are secured to a back plate 47 that extends the full length of the cabinet; and this plate is connected to the ends 20, 21 by screws 48.

The stops 46 are arranged to be moved into engagement with the corners of the blocks whenever they are to be interrupted or stopped from rotation one sixth of a revolution or a multiple thereof to expose a panoramic view through the aperture 15 in the cabinet; the block shaft 22 and cam shaft being driven at substantially the same speed, the interruption of the blocks one-sixth of a revolution or multiple thereof permits an automatic realignment of the faces of the blocks as there are six sides to each block.

Figure 11:
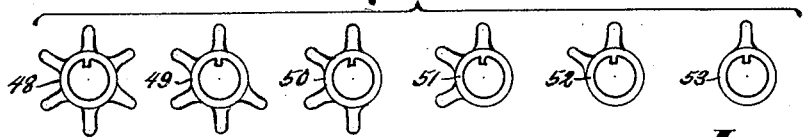
Fig. 11 is a grouped side view of a set of cams that are utilized for moving stops into engagement with the blocks.

The stops 46 can be moved into engagement with the corners of the blocks by any one of a set of cams 48, 49, 50, 51, 52 and 53 shown in a grouped view in Fig. 11; it being understood that there is one set of cams for each block as indicated in Fig. 2; and these cams are arranged to coact with the spring stops 46 to intermittently interrupt and release the blocks in a period of one-sixth of a revolution or multiple thereof, depending on the number of projections on each cam. In other words a cam with one projection will interrupt the rotation of a block at the beginning of a one-sixth period of rotation and release it at the termination of the period so that the faces of the interrupted block will be realigned with the faces of the other moving blocks when started again. It is obvious that the cams with more projections will operate in the same manner.

It is understood that when blocks with only four sides are used the period of interruption of rotation will be one fourth of a revolution or multiple thereof and so on with blocks having more or less sides.

For convenience and cheapness in construction applicant has shown his cams formed of ordinary spur gears with one or more teeth cut out, it being understood that the cams can be constructed in the usual way if desired.

These cams are secured to a sliding shaft 54 that is slidably and rotatably mounted in bearings 55 secured to the ends of the cabinet; and this shaft is extended a considerable distance through the ends of the cabinet so that it can be moved endwise to change the position of the cams relative to their respective stops. In Fig. 1 the right hand end of this shaft is broken away, it being understood that it extends out of the end of the cabinet the same distance as the left hand end on which there is a handle 154 for facilitating the reciprocation of this shaft to change the order of rotation of the blocks. Also in Fig. 2 the ends of shaft 54 are broken away, there not being room for the extended ends in the drawing.

As indicated in Fig. 2 the cams can be placed on the shaft in a promiscuous order, so that a great variety of changes can be made in the rotation of the blocks by moving the shaft 54 endwise in either direction. As shown in this figure the shaft is positioned so that cam 50 engages its stop four times during a revolution of the cam shaft 54 and thereby interrupts the rotation of block 55 two thirds of a revolution. Cam 51 stops the block 56 one half of a revolution, cam 49 stops the block 57 five sixths of a revolution, cam 53 stops the block 58 once and cam 52 stops the block 59 one third of a revolution each revolution of the cam shaft; and, as previously stated, the cams are constructed so that they coact with the stops 46 in interrupting and releasing the block, in a period of one-sixth of a revolution or multiple thereof; and when the blocks are released after an interruption their faces are properly aligned with the faces of the other moving blocks.

It can readily be seen that if the cam shaft 54 is shifted one step to the right the order of the active cams will be changed from 50, 51, 49, 53 and 52 to 49, 52, 51, 49 and 51; and if moved one step to the left the order of the active cams will be 51, 50, 48, 49 and 50.

The cam shaft 54 is driven in timed relation to the block shaft 22 by a train of gears 60, 61 and 62 that are of the same pitch diameter. The intermediate gear 61 is mounted on a jack shaft 63 and its teeth mesh with the teeth of the gear 60 on shaft 22 and also with the teeth of the gear 62 on the cam shaft so that when the shaft 22 is driven the cam shaft will also be actuated in timed relation to it.

The blocks 55, 56, 57, 58 and 59 are preferably constructed substantially alike except that they can have four, six or eight picture sides or faces, it being understood that the number of picture sides to each block can be more or less; and also it is understood that they can be formed of any suitable material.

The ends 44 of the blocks are preferably formed of sheet steel that have integral flanges 64 that are connected by cross angle irons 65 on which the picture faces 66 of the block are mounted and detachably held in place by spring clips 67 that are stamped out of extensions 68 integral with the angle irons.

If desired the ends 44 of the blocks can be perforated with opening 144 through which the light from the lamps can pass from block to block to blend with one another, see Fig. 6.

The plates or picture sides 66 can be formed of any suitable material, but preferably they are formed of glass or other transparent substance, although in some cases it may be desirable to use semi-transparent or opaque material in forming the faces.

As previously indicated the sides are removable from the frame by moving the spring clips 67 into positions to release the marginal edges of the plates by which means the sides of the blocks are removable and interchangeable, and so that an entirely different set of picture faces can be placed on the blocks without removing the block frames from the shaft.

A means is provided for illuminating the interior of the blocks preferably with varied colored lights.

Figure 10:
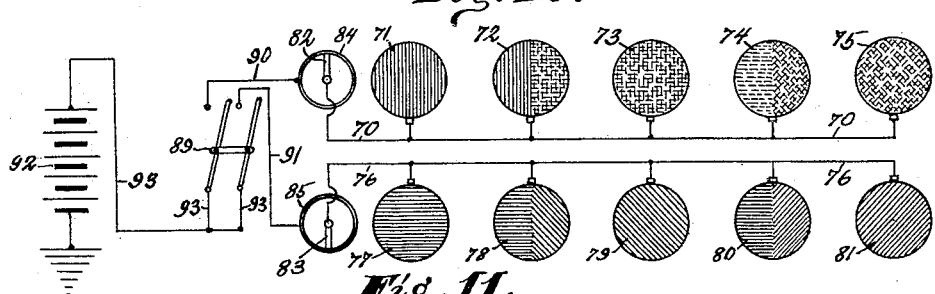
Fig. 10 is a diagrammatic view of the lighting system employed for varied color illuminations of the panoramic views.

The shaft 22 is hollow and lined with an insulation tube 69 through which the wire 70 is extended to the lamps 71, 72, 73, 74 and 75, and also wire 76 to lamps 77, 78, 79, 80 and 81 that are diagrammatically shown in Fig. 10.

The wires 70 and 76 are connected to rotary contacts 82 and 83 that rotate with the shaft 22 and which are arranged to engage the respective contact rings 84, 85 secured on an insulation block 86, see Figs. 4, 5, 6, 7 and 8.

The contacts 82, 83 are yieldingly held in engagement with the rings 84, 85 by springs 87 arranged in insulation plugs 88 so that the shaft 22 is free to turn without breaking electrical connection between these parts.

The rings 84, 85 are connected to a double pole switch 89 by wires 90, 91. The switch is connected to a source of electric energy such as the battery 92 by a split wire 93 so that when desired either one or the other lines of lamps or all of them can be lighted; and continue lighted without interfering with the rotation of the shaft 22.

Preferably the lamps are arranged so that there are two in each block as best shown in Figs. 5 to 8 inclusive and Fig. 10; but there may be more or less if so desired. As indicated in Figs. 5 and 6 sockets 94 are provided in the shaft 22 for the lamps, it being understood that suitable sockets are provided in the shaft for all of the lamps.

Preferably the lamps are colored as indicated in Fig. 10, in which the lamp 71 is red, 72 red and yellow, 73 yellow, 74 yellow and orange, 75 orange, 77 blue, 78 blue and green, 79 green, 80 green and purple, and 81 purple.

It is obvious that a wonderful varigated lighting effect can be obtained by illuminating the lamps when the transparent sides of the blocks carry interchangeable, matched panoramic pictures.

The matching of the pictures to obtain changing panoramic effects is illustrated in Figs. 1, 2 and 9, in which blocks having four pictured faces each are shown. As seen in Fig. 1 a connected panoramic picture is seen through the aperture 15 that is formed by matched faces of the respective blocks, and it is assumed that the apparatus is in operation and that momentarily all of the blocks are held stationary. Then referring to Fig. 2 it is again assumed that blocks 55, 57 and 59 have been moved a quarter turn and the blocks 56 and 58 held stationary whereby an apparently entirely different panoramic view is displayed.

This matching of the block sides to form changeable and interchangeable varied panoramic views is further illustrated in Fig. 9 in which the four pictured sides of the five blocks 55, 56, 57, 58 and 59 are arranged side by side and projected so as to illustrate that the pictures of the adjacent faces of the blocks will match uniformally to produce a panoramic picture of multiform nature.

In other words if one or more of these blocks or all of them are rotated promiscuously in steps of ninety degrees as provided continuously changing panoramic pictures will be displayed through the aperture 15 in the cabinet.

When octagonal blocks 94 are used such as shown diagrammatically in Fig. 12 the apparatus is operated so as to rotate the shaft 22 in steps of forty-five degrees as previously indicated.

In operation the blocks are arranged on the shaft 22 in a uniform position with adjacent pictured faces laying in the same plane with a side of each block visible through the aperture in the cabinet. Then the motor 24 is started to rotate the shaft 22 in intermittent steps of forty-five, sixty or ninety degrees according to the form of blocks used in the apparatus. It is understood of course that the number of teeth in the mutilated gear 29 would need agree with the distance the shaft 22 is to be rotated when the apparatus is made to operate with blocks of four, six, eight faces or more. In other words an apparatus formed to operate with a four sided block is not adapted to operate with blocks with a greater or less number of faces, although the arrangement of the parts and the operation is the same.

As the mutilated gear revolves it turns the shaft 22 a sufficient distance to rotate the blocks one intermittent step if they are not interrupted by the stops 46.

As previously indicated the cam shaft 47 can be manipulated so that all the blocks can be simultaneously held stationary or permitted to rotate in an apparent promiscuous order.

In other words if the cams 48 are secured to the shaft so that they all will engage their respective stops at the same time the six sided blocks will never be permitted to rotate. In other words if the cams have the same number of projections as the number of faces on the blocks they will prevent the blocks from moving which in some instances may be desired in this advertising apparatus; consequently the number of projections on the cams govern the number of interruptions imparted to the blocks on each revolution of the block shaft; and, as previously stated, each projection on the cams coacts with its respective stop 46 to interrupt and release its respective block in periods of one-sixth of a revolution so that the sides of the blocks are properly re-aligned after an interruption, and the stops are arranged to interrupt the rotation of the blocks at the moment their faces are properly aligned in the aperture.

Preferably the cams are arranged in a promiscuous order as shown in Fig. 2, so that all the blocks will not move at the same time;

and so that when the cam shaft is shifted one way or the other a complete change in the order of rotating the blocks will be effected.

In other words the shifting of the cam shaft may cause a block that has been relatively idle to become very active and vice versa.

As previously indicated advertising matter 100 can be placed either on the front of the cabinet or on the blocks; and the faces of the blocks are removable so that they can be taken out when desired and replaced by other sides having other subject matter thereon; and in operation the lamps can be used as and when desired to cause a blending of different colored lights which in addition to passing through the sides of the blocks to illuminate the panoramic pictures thereon also passes through the openings in the ends of the blocks to produce a changing blending color effect.

The openings 144 through the ends of the blocks are arranged so that they are momentarily closed when a stationary block is adjacent to a revolving block, which temporary closing will effect a variation in the lighting.

I claim as my invention:

1. A pictorial display apparatus including a series of similar blocks of uniform size and shape in a row with peripheral faces for pictures, letters and the like, means for rotating said blocks to a predetermined extent, and means for stopping the rotation of any of said blocks when in the desired position relative to the other blocks, substantially as set forth.

2. A pictorial display apparatus including a plurality of blocks adapted to have pictures, letters and the like placed thereon, a shaft on which said blocks are frictionally mounted, means for intermittently rotating said shaft to rotate said blocks and means for stopping any of said blocks when in the desired position relative to the other blocks.

3. A pictorial display apparatus including a plurality of blocks arranged in a row beside each other, a block shaft extending through said blocks, spring bearings secured to said blocks for frictionally engaging said shaft so that said blocks and shaft normally rotate together, and stops for stopping the rotation of any of said blocks at predetermined times.

4. The combination set forth in claim 3, and cams for actuating said stops.

5. The combination set forth in claim 3, and a cam shaft driven in timed relation to said block shaft, and cams on said cam shaft for moving said stops into engagement with said blocks.

6. A pictorial display apparatus including a plurality of blocks adapted to have pictures, letters and the like placed thereon, a block shaft extending through said blocks, spring bearings on said blocks that frictionally engage said shaft and normally cause the blocks to rotate with the shaft, means for intermittently rotating said block shaft, stops normally out of engagement with said blocks, and means for moving said stops into engagement with said blocks for the purpose specified.

7. The combination set forth in claim 6, and a brake for stopping the rotation of said block shaft at the ends of its intermittent rotating periods.

8. A pictorial display apparatus including a plurality of uniform blocks, a block shaft extending through said blocks, spring bearings secured to said blocks and arranged to frictionally engage said shaft so that normally said blocks and shaft rotate together, means for intermittently rotating said shaft, spring stops normally out of engagement with said blocks, a cam shaft arranged to rotate in timed relation to said block shaft, and cams on said cam shaft adapted to intermittently move said stops into engagement with said blocks.

9. The combination set forth in claim 8, and a brake for stopping the rotation of said shafts and blocks at the end of their rotating intermittent periods.

10. In a pictorial display apparatus the combination of a cabinet having an aperture therein, a block shaft, blocks mounted on said shaft so that a face of each block is visible through the aperture in said cabinet, pictures on the faces of said blocks that are adapted to match so as to form panoramic views, and means for promiscuously intermittently rotating said blocks for the purpose specified.

11. In a pictorial display apparatus the combination of a cabinet having an aperture therein, a shaft, blocks on said shaft, faces to said blocks that have pictures thereon that are adapted to form panoramic views, means for promiscuously intermittently rotating one or more of said blocks to change the appearance of the panoramic views, and means for changing the order of rotation of said blocks.

12. In a pictorial display apparatus, a series of blocks mounted in a row beside each other, and having removable faces that are adapted to have pictures, letters and the like placed thereon, and means for intermittently rotating one or more of said blocks so as to form various panoramic views.

13. In a pictorial display apparatus the combination of a cabinet having a display aperture, a rotatable block shaft in the cabinet, blocks frictionally mounted on said shaft and arranged to be visible through said aperture in said cabinet, stops normally out of engagement with said blocks, a cam shaft, cams on said cam shaft arranged to move said stops into engagement with said blocks to intermittently interrupt their rotation with said block shaft, a driving connection between said block shaft and cam shaft, and means for intermittently rotating said block shaft.

14. The combination set forth in claim 13, and a brake for stopping said block shaft at the end of its intermittent rotating periods.

15. The combination set forth in claim 13, and means for reciprocating said cam shaft endwise to change the order of interrupting the rotation of said blocks, and a brake for stopping said block shaft at the ends of its rotating periods.

16. The combination set forth in claim 13, and means whereby said blocks can rotate independently of one another, means for changing the order of interrupting the rotation of said blocks, and a brake for stopping said block shaft at the ends of its rotating periods.

17. In a pictorial display apparatus the combination of a cabinet having a front adapted to have advertising placed thereon, blocks arranged to intermittently rotate adjacent an aperture in said cabinet to attract attention to the advertising thereon; transparent detachable sides to said blocks, colored lamps in said blocks, and means whereby the lights from said lamps can pass from block to block.

In witness whereof, I have hereunto affixed my signature.

GUSTAVUS W. ESCHENBACH.